US008600392B1

(12) United States Patent
Oroskar et al.

(10) Patent No.: US 8,600,392 B1
(45) Date of Patent: Dec. 3, 2013

(54) METHOD AND SYSTEM FOR CHANNEL ASSIGNMENT INTO SOFT HANDOFF (CASHO)

(75) Inventors: Siddharth S. Oroskar, Overland Park, KS (US); Sachin R. Vargantwar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 352 days.

(21) Appl. No.: 13/153,735

(22) Filed: Jun. 6, 2011

(51) Int. Cl.
*H04W 40/00* (2009.01)

(52) U.S. Cl.
USPC ............... 455/446; 455/452.2; 455/422.1; 455/443; 370/332; 370/437; 370/385

(58) Field of Classification Search
None
See application file for complete search history.

(56) References Cited

U.S. PATENT DOCUMENTS

| | | | |
|---|---|---|---|
| 6,078,817 A | 6/2000 | Rahman | |
| 6,134,220 A * | 10/2000 | Le Strat et al. | 370/252 |
| 6,542,484 B1 | 4/2003 | Ovesjo et al. | |
| 6,714,789 B1 | 3/2004 | Oh et al. | |
| 6,944,147 B2 | 9/2005 | Chheda | |
| 6,980,811 B2 | 12/2005 | Harris | |
| 7,039,410 B2 * | 5/2006 | Jovanovic | 455/444 |
| 7,403,505 B2 | 7/2008 | Yoon et al. | |
| 7,505,438 B2 | 3/2009 | Tayloe et al. | |
| 7,505,439 B2 | 3/2009 | Chiang et al. | |
| 7,519,026 B1 | 4/2009 | Oh | |
| 7,978,674 B1 | 7/2011 | Oroskar et al. | |
| 2004/0120290 A1 | 6/2004 | Makhijani et al. | |
| 2004/0131029 A1 * | 7/2004 | Tobe et al. | 370/331 |
| 2004/0192315 A1 | 9/2004 | Li et al. | |
| 2007/0213087 A1 * | 9/2007 | Laroia et al. | 455/522 |
| 2008/0013500 A1 * | 1/2008 | Laroia et al. | 370/338 |
| 2008/0151838 A1 | 6/2008 | Lauderdale et al. | |
| 2010/0278137 A1 | 11/2010 | Kwon et al. | |
| 2011/0310753 A1 * | 12/2011 | Chou et al. | 370/252 |
| 2013/0012189 A1 * | 1/2013 | Hamabe et al. | 455/422.1 |

OTHER PUBLICATIONS

Jou et al., "cdma2000 1x Rev. E Forward Link Voice Capacity", IEEE International Conference on Communications Workshops, 2009.
3rd Generation Partnership Project 2, "Physical Layer Standard for cdma2000 Spread Spectrum Systems, Revision E," 3GPP2 C.S0002-E, Version 2.0, Jun. 2010.

* cited by examiner

*Primary Examiner* — Rafael Pérez-Gutiérrez
*Assistant Examiner* — Keith Fang

(57) ABSTRACT

A mobile station requests origination of a call and reports signal strength measurements of pilot signals from multiple sectors, where some of the sectors support a preferred air interface configuration (such as RC 11) and some do not. The signal strength measurements may be evaluated to determine which sectors to use for the call and whether to use RC 11 or a default air interface configuration (such as RC 3 or RC 4) for the call. Sectors that support the preferred air interface configuration may be evaluated using a first threshold, and sectors that do not support the preferred air interface configuration may be evaluated using a second threshold. The first threshold can be greater than the second threshold, in order to favor the use of sectors that support the preferred air interface configuration over sectors that do not.

18 Claims, 3 Drawing Sheets

METHOD AND SYSTEM FOR CHANNEL ASSIGNMENT INTO SOFT HANDOFF (CASHO)

BACKGROUND

Spread spectrum communications are commonly used in cellular networks that provide wireless service to mobile stations, such as wireless telephones. Cellular networks that use spread spectrum communications often operate in accordance to cdma2000 specifications. The cdma2000 specifications have evolved over time to include various air interface configurations, which are described in the specifications as "Radio Configurations." The specifications define a "Radio Configuration" as follows: "A set of Forward Traffic Channel and Reverse Traffic Channel transmission formats that are characterized by physical layer parameters such as data rates, modulation characteristics, and spreading rate." For example, Radio Configurations 3 and 4 (RC 3 and RC 4) can provide a data rate of up to 9600 bps in a forward fundamental channel, a type of dedicated traffic channel.

Revision E of the cdma2000 physical layer specifications introduced a new air interface configuration, RC 11. Like RC 3 and RC 4, RC 11 can provide a date rate of up to 9600 bps in a forward fundamental channel. However, RC 11 includes several advanced features that can provide capacity and performance benefits. For example, RC 11 can support discontinuous transmission (DTX) service options by including a new 0 bps frame type that can be used during periods of silence. In addition, RC 11 supports frame early termination (FET), which enables a receiver that has successfully decoded a frame before the frame has been completely transmitted to acknowledge receipt and cause further transmission of the frame to be terminated. RC 11 also allows for reduced power control overhead. Further details regarding Revision E can be found in $3^{rd}$ Generation Partnership Project 2, "Physical Layer Standard for cdma2000 Spread Spectrum Systems: Revision E," 3GPP2 C.S0002-E, Version 2.0, June 2010, which is incorporated herein by reference.

OVERVIEW

In a first principal aspect, an exemplary embodiment provides a method in a wireless network. In accordance with the method, a request to originate a call is received from a mobile station. The request includes at least a first signal strength measurement of a signal from a first sector and a second signal strength measurement of a signal from a second sector. The first signal strength measurement is greater than the second signal strength measurement. The first sector is determined to support a preferred air interface configuration. An evaluation is performed to determine whether to use the second sector for the call. The evaluation comprises: (i) if the second sector supports the preferred air interface configuration, determining whether the first and second signal strength measurements are within a first threshold difference; and (ii) if the second sector does not support the preferred air interface configuration, determining whether the first and second signal strength measurements are within a second threshold difference. The first threshold difference is greater than the second threshold difference.

In a second principal aspect, an exemplary embodiment provides a system comprising a first transmitter for transmitting wireless signals into a first sector, a second transmitter for transmitting wireless signals into a second sector, a third transmitter for transmitting wireless signals into a third sector, and a controller. The first and third transmitters support a preferred air interface configuration and a default air interface configuration. The second transmitter supports the default air interface configuration but does not support the preferred air interface configuration. The controller is configured, in response to receiving a request from a mobile station to originate a call, to invoke a selection process for selecting one or more of the first, second, and third sectors for the call and for selecting an air interface configuration for the call from among the preferred and default air interface configurations. The selection process is configured to use at least a first threshold and a second threshold to evaluate a plurality of signal strength measurements reported by the mobile station. The first threshold is greater than the second threshold.

DETAILED DESCRIPTION OF EXEMPLARY EMBODIMENTS

1. Introduction

Figure 1:
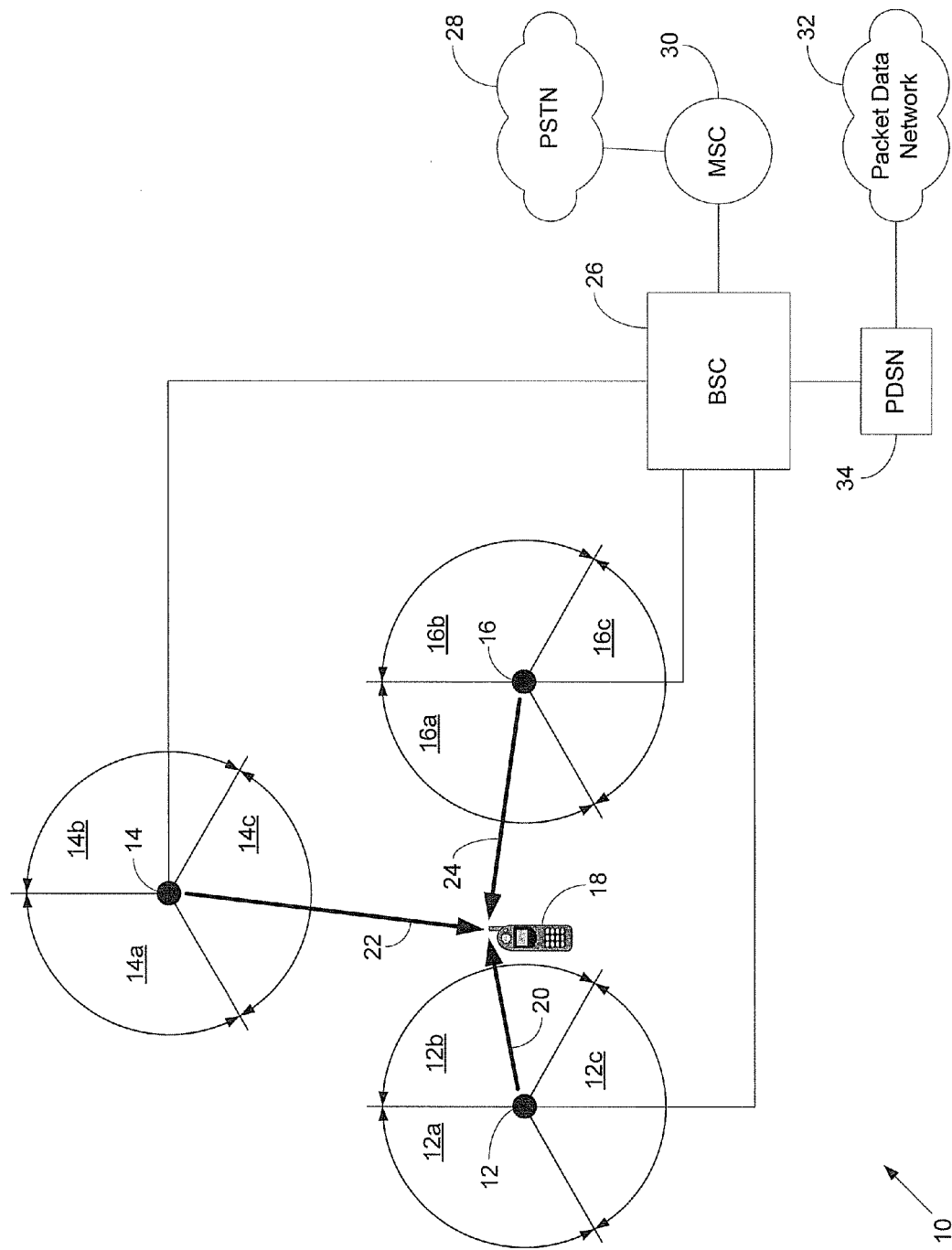
FIG. 1 is a block diagram of a wireless communication system, in accordance with an exemplary embodiment.

Although advanced air interface configurations, such as RC 11, can provide benefits, wireless service providers are likely to upgrade their networks gradually. For example, some base stations may be upgraded to support RC 11 before others. As a result, mobile stations operating in certain areas may receive signals from different base stations that support different air interface configurations. For example, a mobile station may measure strong signals from three base stations in which only two of the base stations support RC 11. In CDMA systems, it can be beneficial for a mobile station to receive forward link signals from multiple base stations or sectors during a call in order to achieve diversity gain. Doing so, however, typically means that all of the forward link signals use the same air interface configuration for the call. Thus, in the case that a mobile stations identifies signals from three base stations, but only two of the base stations support RC 11, the mobile station could either (1) use all three base stations for the call, but with a default air interface configuration, such as RC 3 or RC 4, or (2) use only the two base stations that support RC 11.

In an exemplary embodiment, the choice is made by the wireless network based on signal strength measurements reported by the mobile station. For example, when a mobile station transmits a call origination message, the mobile station may include signal strength measurements from multiple sectors in the message. The network may then evaluate the signal strength measurements to different which of the sectors should be used for the call, for example, using Channel Assignment into Soft Handoff (CASHO) procedures. If the sector with the highest signal strength measurement (the primary sector) is one that supports RC 11, then the network may compare the primary sector's signal strength measurement with the signal strength measurements reported for the other sectors to determine which sector or sectors should be used for the call and which air interface configuration should be used for the call. For sectors that support RC 11, the comparison may use a first threshold. For sectors that do not support RC 11, the comparison may use a second threshold. In particular, if the difference between a given sector's signal strength measurement and the primary sector's signal strength measurement is less than the first threshold (if the given sector supports RC 11) or is less than the second threshold (if the given sector does not support RC 11), then the given sector may be identified as a sector that should be used for the call. Once the sectors to be used for the call are identified, then the air interface configuration to be used for the call can be determined. In particular, if all of the sectors to be used for the call support RC 11, then RC 11 can be used for the call. Otherwise, a default air interface configuration, such as RC 3 or RC 4, is used for the call.

The first and second thresholds can be selected in order to balance the competing benefits of using a preferred air interface configuration, such as RC 11, and achieving diversity gain by using as many sectors as possible. In an exemplary embodiment, the first threshold is larger than the second threshold. This makes it easier for a sector that supports RC 11 to be identified as a sector to be used for a call, which, in turn, makes it more likely that all sectors will support RC 11 and that RC 11 can be used for the call. On the other hand, if a sector that does not support RC 11 is sufficiently strong (e.g., so as to provide a clear advantage from diversity gain), then that sector is included and the call proceeds with the default air interface configuration (RC 3 or RC 4) instead of the preferred air interface configuration (RC 11).

In this way, the benefits of using a preferred air interface configuration for a call can be balanced against the benefits of using as many sectors as possible. Further, while such approaches are useful when choosing between RC 11, as a preferred air interface configuration, and RC 3 or RC 4, as a default air interface configuration, it is to be understood that the same or similar approaches can also be used when considering other preferred air interface configurations and/or other default air interface configurations.

2. Exemplary Network Architecture

FIG. 1 illustrates a wireless communication system 10 in which exemplary embodiments may be employed. System 10 includes a wireless network that includes a plurality of base stations, exemplified in FIG. 1 by base stations 12, 14, and 16. Each base station may be able to wirelessly communicate with mobile stations, such as mobile station 18. Mobile station 18 could be a wireless telephone, wireless personal digital assistant, wireless e-mail device, wirelessly-equipped laptop computer, or other wireless communication device. In an exemplary embodiment, the communications between mobile station 18 and a base station in the wireless network use a code division multiple access (CDMA) air interface, for example, in accordance with cdma2000 specifications.

Each base station may include a plurality of transmitters and a plurality of receivers (the transmitters and receivers may be integrated into transceivers) for wireless communication with mobile stations, such as mobile station 18. Moreover, each base station may include directional antennas to define a plurality of sectors. For example, base station 12 may define sectors 12a, 12b, and 12c, base station 14 may define sectors 14a, 14b, and 14c, and base station 16 may define sectors 16a, 16b, and 16c. Thus, each base station may include of one or more transmitters for transmitting wireless signals into each sector and one or more receivers for receiving wireless signals from each sector. Although FIG. 1 shows each base station with three sectors, it is to be understood that a base station may have a greater or fewer number of sectors. Moreover, it is to be understood that the illustration of sectors in FIG. 1 is schematic only and that FIG. 1 is not intended to illustrate the precise geographic area covered by any sector.

Even though base stations 12, 14, and 16 may function together as a wireless network, they may have different capabilities. Thus, some of the base stations may support advanced air interface configurations (such as RC 11), whereas the others do not. However, all of the base stations may support a default air interface configuration (such as RC 3 or RC 4). For example, base stations 12 and 16 (and their corresponding sectors) may support both the preferred and default air interface configurations, whereas base station 14 (and its corresponding sectors) might support the default air interface configuration but not the preferred air interface configuration.

The wireless communication between a mobile station and a sector may occur via one or more forward link channels (for communications from a transmitter in the sector to the mobile station) and one or more reverse link channels (for communications from the mobile station to a receiver in the sector). For example, the forward link channels may include a pilot channel, a sync channel, paging channels, and forward traffic channels. The reverse link channels may include access channels and reverse traffic channels.

The signals in the forward link channels of a sector may each have a phase that is specific for that sector. That way, the mobile station can identify signals from different sectors based on phase. For example, mobile station 18 may receive a pilot signal 20 from a transmitter in base station 12 associated with sector 12b, a pilot signal 22 from a transmitter in base station 14 associated with sector 14c, and a pilot signal 24 from a transmitter in base station 16 associated with sector 16a. Mobile station 18 may distinguish between pilot signals 20-24 based on their phases.

Mobile station 18 may, at various times, measure the signal strengths of pilot signals that it receives and report the signal strength measurements to the wireless network. For example, mobile station 18 may measure the signal strengths of pilot signals 20, 22, and 24 and report the signal strength measurements, along with identifications of the sectors to which the signal strength measurements correspond (i.e., sectors 12b, 14c, and 16a). The report could be a message that mobile station 18 transmits in an access channel.

The sectors with the strongest pilot signals, as measured by the mobile station, may be included in the mobile station's "active set." For example, sectors 12b, 14c, and 16a could be in the active set of mobile station 18. Further, the sector with the strongest pilot signal, as measured by the mobile station, may be designated the mobile station's "primary" sector. For example, sector 12b might be the primary sector of mobile station 18. With sector 12b as the primary sector, mobile station 18 may preferentially monitor the paging channel of sector 12b and may preferentially use access channels of sector 12b to transmit messages to the wireless network.

Base stations 12, 14, and 16 may be controlled by a base station controller (BSC) 26. For example, BSC 26 may control the assignment of forward and reverse traffic channels for wireless communication between base stations 12, 14, and 16 and mobile stations, such as mobile station 18. Assignment of traffic channels may occur when a mobile station, such as mobile station 18, originates a call or when a call is terminated to a mobile station that is operating in an area served by BSC 26. BSC 26 may also control handoffs between the sectors in its service area (i.e., sectors 12a-c, 14a-c, and 16a-c).

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data call with an endpoint via packet data network 32, e.g., for voice-over-packet (VoP) communication, to send or receive e-mail, to browse the World Wide Web, to receive streaming video and/or audio, to participate in Internet gaming, or for other purposes.

As described in more detail below, a mobile station, such as mobile station 18, may use more than one sector for a call. The sectors that are used for the call may be determined by a control entity in the wireless network, such as BSC 26, based on signal strength measurements. For example, to originate a call, mobile station 18 may transmit a call origination message into an access channel of sector 12b (as the primary sector of mobile station 18). Mobile station 18 may include in the call origination message signal strength measurements of pilot signals from one or more sectors (such as the sectors in its active set) along with identifications of the sectors. Thus, mobile station 18 may include signal strength measurements for sectors 12b, 14c, and 16a in the call origination message. BSC 26 may then evaluate the signal strength measurements to determine which sectors to use for the call requested by mobile station 18. Depending on the outcome of the evaluation, BSC 26 might assign all three sectors for the call, just two of the sectors for the call, or just one of the sectors for the call. Further, BSC 26 may determine what air interface configuration to use for the call, e.g., whether to use a preferred air interface configuration (such as RC 11) or a default air interface configuration (RC 3 or RC 4). As discussed below, which air interface configuration is selected for the call may depend on which sectors are selected.

3. Exemplary Methods

Figure 2:
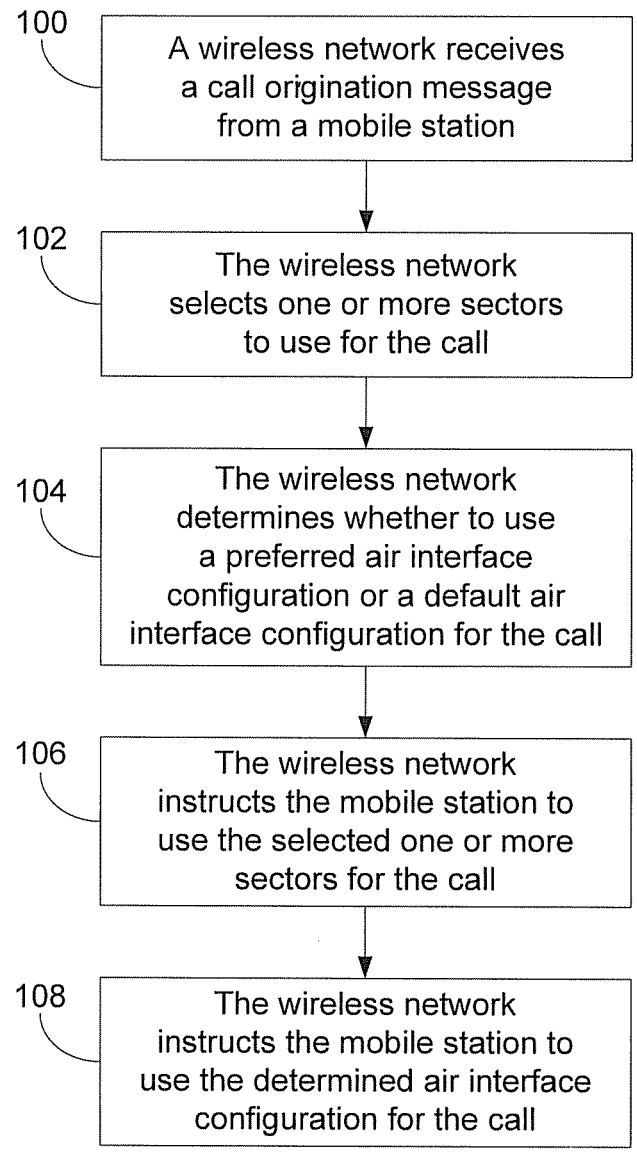
FIG. 2 is a flow chart illustrating a method of selecting one or more sectors and an air interface configuration to use for a call, in accordance with an exemplary embodiment.
Figure 3:
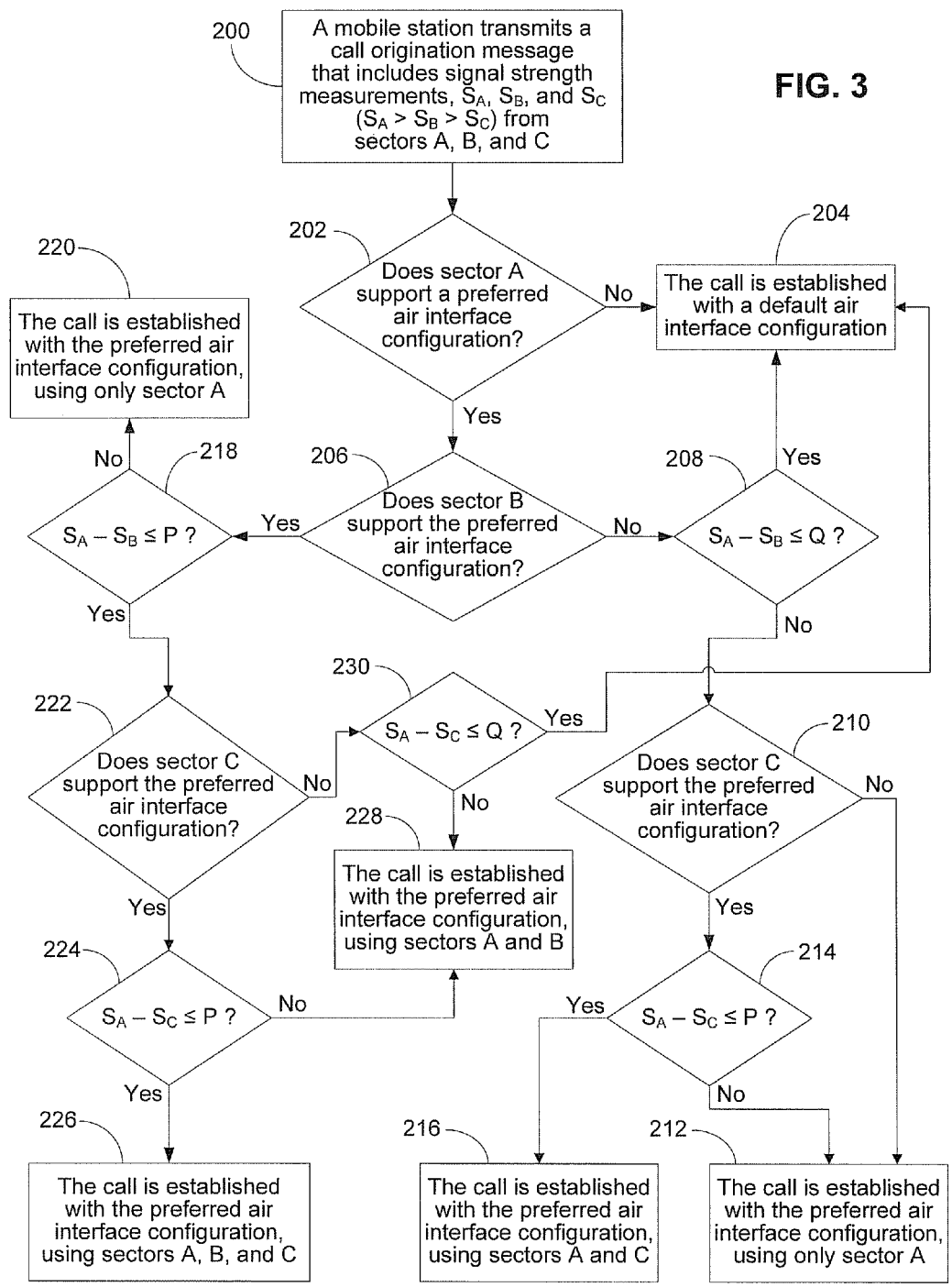
FIG. 3 is a flow chart further illustrating a method of selecting one or more sectors and an air interface configuration to use for a call, in accordance with an exemplary embodiment.

FIGS. 2 and 3 illustrate exemplary methods that can be used for selecting one or more sectors to use for a call and for selecting an air interface configuration to use for the call. The methods could use either the network architecture shown in FIG. 1 or a different network architecture.

With reference to FIG. 2, an exemplary method begins when a wireless network receives a call origination message from a mobile station, as indicated by block 100. The call origination message is a message requesting establishment of a call between the mobile station and one or more endpoints. The message could be transmitted in an access channel, using one or more access probes. The requested call could be, for example, a voice call or a data call. In addition, the call origination message could include various parameters regarding the requested call, such as a preferred air interface configuration. The call origination message could also include one or more signal strength measurements taken by the mobile station. For example, the call origination message could include a signal strength measurement of a pilot signal transmitted by the mobile station's primary sector (typically, this is the sector with the highest pilot signal strength at the mobile station) as well as signal strength measurements of pilot signals from one or more other sectors.

After receiving the call origination message, the wireless network may select one or more sectors to use for the call, as indicated by block 102. The selection could be based, at least in part, on signal strength measurements, such as the signal strength measurements reported in the call origination message. Alternatively or additionally, the wireless network may consider signal strength measurements reported by the mobile station at other times. In addition to signal strength measurements, the wireless network could take into account other factors, such as sector loads, when selecting one or more sectors for the call.

The wireless network may also determine whether to use a preferred air interface configuration or a default air interface configuration for the call, as indicated by block 104. The preferred air interface configuration could be identified in the call origination message or in a user profile associated with the mobile station. Alternatively, the wireless network may simply consider a particular air interface configuration to be preferred, for example, because it provides higher data rates, greater efficiency, better performance, or advanced features. For example, the wireless network may consider RC 11 to be a preferred air interface configuration. The default air interface configuration could be an air interface configuration that is not as advanced as the preferred air interface configuration but is more widely available. For example, the default air interface configuration could be RC 3 or RC 4. In some embodiments, the preferred air interface configuration is supported by some base stations but not others, whereas the default air interface configuration is generally supported. Thus, the determination of whether to use the preferred air interface configuration or the default air interface configuration could be based, at least in part, on the capabilities of the one or more sectors selected for the call.

Once the wireless network has selected one or more sectors to use for the call and has determined which air interface to use for the call, the wireless network may inform the mobile station, for example, as part of the process of establishing the requested call. Thus, the wireless network may instruct the mobile station to use the selected one or more sectors for the call, as indicated by block 106. The wireless network may also instruct the mobile station to use the determined air interface for the call, as indicated by block 108. These instructions could take the form of one or more Channel Assignment messages. For example, the wireless network may assign forward traffic channels for each of the selected sectors and may assign the determined air interface configuration (either the preferred air interface configuration or the default air interface configuration) for each of the forward traffic channels. The wireless network may similarly assign reverse traffic channels for each of the selected sectors (and corresponding air interface configurations). The wireless network may then transmit a Channel Assignment message to the mobile station, instructing the mobile station to use the assigned channels and air interface configurations.

In this way, a call may be established using either a preferred air interface configuration or a default air interface configuration, based on an evaluation performed by the wireless network (more particularly, based on an evaluation performed by a control entity in the wireless network, such as BSC 26). Although the call in FIG. 2 is a call that is originated by the mobile station, it is to be understood that the wireless network may similarly select one or more sectors and an air interface configuration in response to a request to terminate a call to a mobile station. It is also to be understood that in some embodiments, the mobile station, rather than the wireless network, may determine which sectors to use for a call and/or which air interface configuration to use for a call.

FIG. 3 illustrates a specific example in which two thresholds, P and Q, are used to evaluate signal strength measurements reported by the mobile station. Threshold P is used to evaluate sectors that support the preferred air interface configuration (e.g., RC 11), and threshold Q is used to evaluate sectors that do not support the preferred air interface configuration but support a default air interface configuration (e.g., RC 3 or RC 4). In this example, P>Q, in order to favor sectors that support the preferred air interface configuration.

The method may begin when a mobile station transmits a call origination message that includes signal strength measurements, $S_A$, $S_B$, $S_C$, of pilot signals transmitted by sectors A, B, and C, as indicated by block 200. These signal strength measurements may be taken by the mobile station shortly before transmitting the call origination message. The sectors may correspond to the mobile station's active set. In this example, $S_A > S_B > S_C$, indicating that sector A is the mobile station's primary sector.

The air interface configuration that is used for the requested call could depend initially on a determination of whether the primary sector, sector A, supports a preferred air interface configuration, as indicated by block 202. If sector A does not support the preferred air interface configuration, then the call is established with a default air interface configuration, as indicated by block 204. However, if the preferred air interface configuration is supported by sector A, then the next consideration may be whether sector B also supports the preferred air interface configuration, as indicated by block 206.

If sector B does not support the preferred air interface configuration, but supports the default air interface configuration, then the signal strength measurement reported for sector B could be evaluated against the signal strength measurement reported for sector A, using threshold Q, as indicated by block 208. If $S_A - S_B \le Q$, then the signal strength of sector B is high enough that sector B should be used for the call. However, since sector B does not support the preferred air interface configuration, this means that the call is established with the default air interface configuration, as indicated by block 204.

If $S_A$ and $S_B$ differ by more than Q, then sector B is not used for the call. Sector C might still be used for the call, depending on whether sector C supports the preferred air interface configuration, as indicated by block 210. If sector C does not support the preferred air interface configuration, then its signal strength, like that of sector B, may be compared to that of sector A. However, since $S_B$ has already been found to differ from $S_A$ by more than Q, and $S_C$ is less than $S_B$, sector C would also not be used for the call. Thus, the call would be established with the preferred air interface configuration, using only sector A, as indicated by block 212.

On the other hand, if sector C does support the preferred air interface configuration, then $S_C$ could be compared to $S_A$, using threshold P, as indicated by block 214. If $S_A$ and $S_C$ differ by less than or equal to P (i.e., if $S_A - S_C \le P$), then both sector A and sector C are used for the call, and the call is established with the preferred air interface configuration, as indicated by block 216. Otherwise, sector C is not used for the call, and the call is established using only sector A and, with the preferred air interface configuration, as indicated by block 212.

Blocks 208 through 216, as shown in FIG. 3 and described above, apply to the case that sector B does not support the preferred air interface configuration. However, if sector B does support the preferred air interface configuration, then $S_B$ could be compared to $S_A$, using threshold P, as indicated by block 218. If $S_A$ and $S_B$ differ by more than P, then sector B is not used for the call. Instead, the call is established with the preferred air interface configuration, using only sector A, as indicated by block 220 (sector C need not be considered since $S_C$ is less than $S_B$). On the other hand, if $S_A - S_B \le P$, then the evaluation may consider whether sector C supports the preferred air interface configuration, as indicated by block 222.

If sector C does support the preferred air interface configuration, then $S_C$ may be compared to $S_A$, using threshold P, as indicated by block 224. If $S_A - S_C \le P$, then the call is established with the preferred air interface configuration, using sectors A, B, and C, as indicated by block 226. However, if $S_A$ and $S_C$ differ by more than P, then sector C is not used for the call. Thus, the call is established with the preferred air interface configuration, using sectors A and B, as indicated by block 228.

If sector C does not support the preferred air interface configuration, then threshold Q may be used to compare $S_A$ and $S_C$, as indicated by block 230. If $S_A - S_C \le Q$, then sector C is used for the call, even though it does not support the preferred air interface configuration. Thus, the call is established with the default air interface configuration, as indicated by block 204. On the other hand, if $S_A$ and $S_C$ differ by more than Q, then sector C is not used for the call. Thus, the call is established with the preferred air interface configuration, using sectors A and B, as indicated by block 228.

Although FIG. 3 illustrates an example in which the mobile station reports signal strength measurements from three sectors, it is to be understood that the mobile station could report signal strength measurements from a greater or fewer number of sectors. Further, the evaluation illustrated in FIG. 3 is exemplary only. For example, the evaluation could include a greater number of thresholds, such as different thresholds for the second and third highest signal strength measurements. Alternatively or additionally, the thresholds could be applied differently. For example, the Q threshold might be applied to the second highest signal strength measurement but not applied to the third highest signal strength measurements if two sectors that support the preferred air interface configuration can be used for the call. Thus, the parameters and procedures could be adjusted so that the evaluation more or less heavily favors the establishment of calls with the preferred air interface configuration over the establishment of calls that use more sectors but with the default air interface configuration. In this way, the benefits of the preferred air interface configuration can be balanced against the benefits of diversity gain.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method in a wireless network, comprising:
   receiving, from a mobile station, a request to originate a call, wherein said request includes at least a first signal strength measurement of a signal from a first sector and a second signal strength measurement of a signal from a second sector, and wherein said first signal strength measurement is greater than said second signal strength measurement;
   determining that said first sector supports a preferred air interface configuration; and
   performing an evaluation to determine whether to use said second sector for said call, wherein said evaluation comprises:
   (i) if said second sector supports said preferred air interface configuration, determining whether said first and second signal strength measurements are within a first threshold difference; and
   (ii) if said second sector does not support said preferred air interface configuration, determining whether said first and second signal strength measurements are within a second threshold difference, wherein said first threshold difference is greater than said second threshold difference.

2. The method of claim 1, wherein said evaluation comprises:
   determining that said second sector supports said preferred air interface configuration.

3. The method of claim 2, wherein said evaluation comprises:
   determining that said first and second signal strength measurements are within said first threshold difference.

4. The method of claim 3, further comprising:
   instructing said mobile station to use said first and second sectors and said preferred air interface configuration for said call.

5. The method of claim 2, wherein said evaluation comprises:
   determining that said first and second signal strength measurements are not within said first threshold difference.

6. The method of claim 5, further comprising:
   instructing said mobile station to use said first sector and said preferred air interface configuration for said call.

7. The method of claim 1, wherein said evaluation comprises:
   determining that said second sector supports a default air interface configuration but does not support said preferred air interface configuration.

8. The method of claim 7, wherein said evaluation comprises:
   determining that said first and second signal strength measurements are within said second threshold difference.

9. The method of claim 8, further comprising:
   instructing said mobile station to use said first and second sectors and said default air interface configuration for said call.

10. The method of claim 7, wherein said evaluation comprises:
    determining that said first and second signal strength measurements are not within said second threshold difference.

11. The method of claim 10, further comprising:
    instructing said mobile station to use said first sector and said preferred air interface configuration for said call.

12. The method of claim 1, wherein determining whether said first and second signal strength measurements are within a first threshold difference comprises:
    subtracting said second signal strength measurement from said first signal strength measurement to obtain a signal strength difference; and
    comparing said signal strength difference to said first threshold difference.

13. The method of claim 1, wherein determining whether said first and second signal strength measurements are within a second threshold difference comprises:
    subtracting said second signal strength measurement from said first signal strength measurement to obtain a signal strength difference; and
    comparing said signal strength difference to said second threshold difference.

14. The method of claim 1, wherein said preferred air interface configuration is RC11.

15. The method of claim 1, wherein said request further includes a third signal strength measurement of a signal from a third sector, wherein said third signal strength measurement is less than said second signal strength measurement, and wherein said evaluation further comprises:
    (iii) if said third sector supports said preferred air interface configuration, determining whether said first and third signal strength measurements are within said first threshold difference; and
    (iv) if said third sector does not support said preferred air interface configuration, determining whether said first and third signal strength measurements are within said second threshold difference.

16. A system, comprising:
    a first transmitter for transmitting wireless signals into a first sector, wherein said first transmitter supports a default air interface configuration and a preferred air interface configuration;
    a second transmitter for transmitting wireless signals into a second sector, wherein said second transmitter supports said default air interface configuration but does not support said preferred air interface configuration;
    a third transmitter for transmitting wireless signals into a third sector, wherein said third transmitter supports said default air interface configuration and said preferred air interface configuration; and
    a controller, wherein said controller is configured, in response to receiving a request from a mobile station to originate a call, to invoke a selection process for selecting one or more of said first, second, and third sectors for said call and for selecting an air interface configuration for said call from among said preferred and default air interface configurations, wherein said selection process is configured evaluate a plurality of signal strength measurements reported by said mobile station, said plurality of signal strength measurements including a first signal strength measurement of a signal from said first sector, a second signal strength measurement of a signal from said second sector, and a third signal strength measurement of a signal from said second sector, and to determine whether said first and third signal strength measurements are within a first threshold difference and whether said first and second signal strength measurements are within a second threshold difference, wherein said first threshold difference is greater than said second threshold difference.

17. The system of claim 16, wherein said first signal strength measurement is greater than said second signal strength measurement and said second signal strength measurement is greater than said third signal strength measurement.

18. The system of claim 16, wherein said controller comprises a base station controller.

* * * * *